United States Patent

Schleicher et al.

[11] Patent Number: 5,646,202
[45] Date of Patent: Jul. 8, 1997

[54] POLYARYLENE SULFIDE MOLDING COMPOSITION

[75] Inventors: Andreas Schleicher, Einhausen; Jan-Peter Piesold, Augsburg; Klaus Kohlhepp, Eppstein, all of Germany

[73] Assignee: Hoechst Aktiengesellschaft, Germany

[21] Appl. No.: 667,041

[22] Filed: Jun. 21, 1996

Related U.S. Application Data

[63] Continuation of Ser. No. 337,158, Nov. 9, 1994, abandoned.

[30] Foreign Application Priority Data

Nov. 11, 1993 [DE] Germany ............... 43 38 541.9

[51] Int. Cl.⁶ .................................. C08K 9/06
[52] U.S. Cl. ................. 523/212; 524/317; 524/447; 524/449; 524/451; 524/609
[58] Field of Search .................... 524/317, 451, 524/609, 447, 449; 523/212

[56] References Cited

U.S. PATENT DOCUMENTS

| | | | |
|---|---|---|---|
| 4,395,509 | 7/1983 | Blackwell | 524/609 |
| 4,482,665 | 11/1984 | Dix | 524/609 |
| 4,960,813 | 10/1990 | Wadhwa et al. | 524/609 |
| 5,021,497 | 6/1991 | Ohara et al. | 523/212 |
| 5,045,585 | 9/1991 | Bier et al. | 524/281 |
| 5,234,984 | 8/1993 | Kohler et al. | 524/609 |
| 5,302,651 | 4/1994 | Kawashima et al. | 524/609 |

FOREIGN PATENT DOCUMENTS

| | | |
|---|---|---|
| 0236835 | 9/1987 | European Pat. Off. . |
| 0304785 | 3/1989 | European Pat. Off. . |
| 0459229 | 4/1991 | European Pat. Off. . |
| 3907473A1 | 6/1990 | Germany . |
| 4017243A1 | 12/1991 | Germany . |

OTHER PUBLICATIONS

"Eigenschaften und Anwendungen eines neuen linearen Polyphenylensulfids", K. Kohlhepp, Kunststoffe 79 (1989), 602.

*Primary Examiner*—Mark D. Sweet
*Attorney, Agent, or Firm*—Connolly & Hutz

[57] ABSTRACT

A molding composition comprising
(A) from 20 to 80% by weight of at least one polyarylene sulfide,
(B) from 1 to 60% by weight of at least one mineral filler,
(C) from 1 to 65% by weight of at least one surface-modified mineral filler and
(D) from 0.01 to 0.4% by weight of at least one saturated, long-chain carboxylic ester,
can be injection-molded or extruded to give moldings which have high surface quality and isotropic property behavior. Metallization of the moldings proves to be durable, which makes them suitable for use in lamps, in particular reflectors and electronic functional parts.

8 Claims, No Drawings

POLYARYLENE SULFIDE MOLDING COMPOSITION

This application is a continuation of application Ser. No. 08/337,158, filed on Nov. 9, 1994, now abandoned.

The invention relates to molding compositions comprising polyarylene sulfides, preferably polyphenylene sulfide (PPS), for the production of reflectors and functional parts of high planarity. Reflective articles produced therefrom, such as lamps, preferably headlamps and reflectors, and electronic functional parts, must satisfy high planarity requirements for metallization.

DE-A 39 07 473 discloses the production of moldings having optically high-quality surfaces from polyarylene sulfide molding compositions. However, these moldings have low flexural strengths which are inadequate for many applications. An improvement in the flexural strength is achieved by adding inorganic fibers (DE-A 40 17 243). However, this results in anisotropic properties, such as anisotropic tear strength or anisotropic warpage, which is a particular disadvantage in applications as headlamp reflectors in motor vehicles.

The object was therefore to prepare polyarylene sulfide molding compositions which do not have the negative properties of the known polyarylene sulfide compositions.

Another important point in the development of molding compositions for reflectors is the choice of suitable lubricants and mold-release auxiliaries. These must support demolding, but must not accumulate at the surface in the course of time during injection molding. Furthermore, the lubricant must not have an adverse effect on metal adhesion, even under extreme climatic conditions.

It has now been found that isotropic polyarylene sulfide molding compositions containing purely mineral fillers can be converted into moldings having optically high-quality surfaces and at the same time good mechanical properties. They can be, for example, metallized directly and have high flexural strengths if, in addition to conventional fillers, they contain certain surface-modified, for example aminosilane-coated fillers and additionally lubricants based on saturated long-chain carboxylic esters.

The invention therefore relates to molding compositions comprising:

(A) from 20 to 98% by weight of at least one polyarylene sulfide, preferably polyphenylene sulfide, (B) from 1 to 60% by weight, preferably from 10 to 45% by weight, in particular from 10 to 35% by weight, of at least one mineral filler, (C) from 1 to 65% by weight, preferably from 5 to 45% by weight, in particular from 10 to 35% by weight, of at least one surface-modified mineral filler and (D) from 0.01 to 0.4% by weight, preferably from 0.01 to 0.3% by weight, in particular from 0.01 to 0.2% by weight, of at least one saturated long-chain carboxylic ester.

The polyarylene sulfides (component (A)) which can be employed according to the invention are preferably linear polyphenylene sulfides and have been known for some time (K. Kohlhepp, Kunststoffe, 79 (1989), 602). They have viscosities of from 0.5 to 500 Pa·s (310° C., shear rate 1000 $s^{-1}$). The polyarylene sulfide is generally neutral, i.e. material immersed in distilled water gives a pH of from 6 to 8.5.

The fillers of component (B) are mineral fillers in flake, leaf or bead form which have a mean particle diameter of 0.5 to 200 μm, preferably from 0.5 to 150 μm and in particular from 0.5 to 100 μm. Use is made of conventional, known substances, such as chalk and talc, individually or in combination.

The fillers of component (C) are surface-modified minerals, for example amino- and/or epoxy silane-coated silicates. Suitable surface-modified minerals according to the invention are mineral fillers selected, for example, from the group consisting of the various micas, kaolins and quartzes, preferably inert, neutral silicates which, when immersed in demineralized water, generally result in a pH of from 6 to 8.5, preferably 6.5 to 7.5.

According to the invention, component (D) is a long-chain, saturated carboxylic ester. Preference is given to partial or full esters of linear, saturated, aliphatic carboxylic acids having a chain length of more than 20 carbon atoms, preferably having 24 to 36 carbon atoms, with pentaerythritol or trimethylolpropane. Particular preference is given to esters of technical-grade montanic acids. Montanic acids are obtainable by oxidative bleaching of naturally occurring crude montan wax and comprise predominantly carboxylic acids of said structure (Römpp Chemie Lexikon, 8th Edn., Vol. 4, p. 2667). The substances of components (A) to (D) can each be employed individually or as a mixture.

The molding compositions of the invention can be converted into moldings by conventional methods, for example injection molding or extrusion; during injection molding, they do not cause any deposition in the injection mold even after a number of injection-molding operations. They are therefore advantageously suitable as materials for injection moldings which are subjected to high surface-quality and isotropic dimensional stability requirements and which simultaneously have improved mechanical properties, for example high heat distortion resistance.

The moldings produced according to the invention can readily and durably be directly metallized, i.e. they can be coated with metals, such as copper, nickel, aluminum, inter alia, by known methods, such as vacuum vapor deposition and gas electroplating. The metals are preferably vapor-deposited after conventional plasma pretreatment. The injection moldings can be used, for example, as reflective articles, such as lamps and reflectors, after direct metallization or used for electronic functional parts.

Examples

The molding compositions were prepared using a commercially available polyphenylene sulfide, for example ®Fortron (Hoechst AG, Frankfurt am Main, Germany), which, after immersion in ion-free water, produces a virtually neutral water pH, i.e. a pH of from 6 to 8.5.

The neutral polyphenylene sulfide is compounded with the additives in a conventional single- or twin-screw extruder to give the molding compositions of the invention.

Conventional injection molding of these gives reflectors for the automotive sector and standard test specimens for measurement of the mechanical properties in accordance with DIN standards.

The reflectors and standard sheets are vapor-deposited with aluminum under reduced pressure by known methods. The quality of the metallization is assessed visually: 1=good, up to 10=poor.

The formulations in Examples 1 and 2 according to the invention with the measured flexural strengths and the visual assessment after metallization are shown in Table 1. The formulations and results from DE-A 40 17 243 have been used as comparative examples.

TABLE 1

| | Example 1 | Example 2 | Comp. Example[5] 1 | Comp. Example[5] 2 | Comp. Example[5] 3 |
|---|---|---|---|---|---|
| PPS[1] | 44.9 | 54.9 | 39.5 | 47.5 | 47.5 |
| Talc[2] | 15 | 13 | | | |
| Kaolin, aminosilane-coated[3] | 40 | 32 | | | |
| Pentaerythritoyl tetramontanate[4] | 0.1 | 0.1 | | | |
| Mineral filler ($CaCO_3/MgCO_3$)[5] | | | 60 | 37 | 37 |
| Glass fibers[5] | | | | 15 | |
| Potassium titanate whiskers[5] | | | | | 15 |
| Montanic esters (E-wax)[5] | | | 0.5 | 0.5 | 0.5 |
| Flexural strength [MPa] (in accordance with DIN 53452) | 137 | 134 | 80 | 130 | 115 |
| Metallization: visual assessment (1 = good, 10 = poor) | 2 | 1 | 1 | 6 | 2 |

[1] Polyphenylene sulfide powder, viscosity from 30 to 35 Pa · s at 306° C., shear rate 1000 s$^{-1}$
[2] Talc 20 MOOS (Luzemac, Düsseldorf)
[3] Translink 445 (Engelhard Corp., Edison, NJ, U.S.A.)
[4] ® Hostamont TP ET 141 (Hoechst AG, Frankfurt am Main)
[5] As described in DE-A 40 17 243 or EP-A 0 459 229

Comparative Example 1 has good metallization, but poor flexural strength, and Comparative Examples 2 and 3 have considerably better flexural strengths and in one case good metallization, but do not have isotropic behavior in a number of properties, for example the tear strength, as a consequence of the addition of glass fibers or whiskers.

We claim:
1. A molding composition comprising

(A) from 20 to 80% by weight of at least one polyarylene sulfide, (B) from about 13 to about 15% by weight of at least one mineral filler selected from the group consisting of chalk and talc, (C) from about 32 to about 40% by weight of at least one surface-modified mineral filler selected from the group consisting of mica, koalin and quartz, and (D) from 0.01 to 0.4% by weight of at least one saturated, long-chain carboxylic ester.

2. A molding produced from a molding composition as claimed in claim 1.

3. A molding produced from a molding composition as claimed in claim 1 by injection molding or extrusion.

4. A molding produced from a molding composition as claimed in claim 1, which is vapor-deposited with under reduced pressure.

5. A molding produced from a molding composition as claimed in claim 1, which is vapor-deposited with aluminum under reduced pressure.

6. A molding produced from a molding composition as claimed in claim 1, wherein plasma pretreatment is carried out.

7. A molding produced from a molding composition as claimed in claim 1, which has isotropic dimensional stability at the same time as high flexural strength.

8. A molding produced from a molding composition as claimed in claim 1 in the form of reflective articles and electronic functional parts.

* * * * *

UNITED STATES PATENT AND TRADEMARK OFFICE
CERTIFICATE OF CORRECTION

PATENT NO. : 5,646,202
DATED : JULY 8, 1997
INVENTOR(S) : ANDREAS SCHLEICHER ET AL

It is certified that error appears in the above-indentified patent and that said Letters Patent is hereby corrected as shown below:

Column 1, line 25, "knownpolyarylene" should read -- known polyarylene".

Column 4, line 20 (claim 4, line 2), "with under" should read -- with metal under --.

Signed and Sealed this

Twenty-third Day of September, 1997

Attest:

BRUCE LEHMAN

Attesting Officer

Commissioner of Patents and Trademarks